(12) United States Patent
Robertson

(10) Patent No.: US 7,723,431 B1
(45) Date of Patent: *May 25, 2010

(54) LOW-HAP AND ZERO-HAP POLYESTER RESIN SYSTEMS AND ARTICLES PREPARED USING SAME

(75) Inventor: Brian A. Robertson, The Colony, TX (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/652,849

(22) Filed: Jan. 6, 2010

Related U.S. Application Data

(63) Continuation of application No. 10/516,238, filed as application No. PCT/US03/16658 on May 27, 2003, now Pat. No. 7,655,724.

(60) Provisional application No. 60/384,753, filed on May 29, 2002.

(51) Int. Cl.
*C08L 67/06* (2006.01)
(52) U.S. Cl. ........................ 525/44; 525/168
(58) Field of Classification Search ............... 525/44, 525/168
See application file for complete search history.

(56) References Cited

U.S. PATENT DOCUMENTS

| | | | |
|---|---|---|---|
| 5,567,767 A | 10/1996 | Smeal | |
| 5,571,863 A | 11/1996 | Smeal | |
| 5,679,878 A | 10/1997 | Chen et al. | |
| 5,688,867 A * | 11/1997 | Scheibelhoffer et al. | 525/168 |
| 5,874,503 A | 2/1999 | Scheibelhoffer et al. | |
| 6,063,864 A | 5/2000 | Mathur | |
| 6,268,464 B1 | 7/2001 | Keinänen et al. | |
| 6,332,998 B1 | 12/2001 | Yamagata et al. | |

FOREIGN PATENT DOCUMENTS

WO   WO 00/23495   4/2000

OTHER PUBLICATIONS

"Deltech monomers intro sheet" obtained from the internet archive on Mar. 4, 2010 at http://web.archive.org/web/20010610011526/www.deltechcorp.com/html/monomers/monointro.htm, printed on Mar. 4, 2010.*

"Deltech Corporation-Monomers Main" obtained from the Internet Archive for Aug. 4, 2002 at: web.archive.org/web/20020804185225/www.deltechcorp.com/deltech02/monomers/monoframes.htm, pp. 1-2 printed on Nov. 29, 2004.

"Deltech Corporation, TBS (monomer) tertiary Butylstyrene" obtained from the Internet Archive for Jun. 19, 2002 at: web.archive.org/web/20020619033020/www.deltechcorp.com/deltech02/monomers/monoframes.htm, pp. 1-3 printed on Mar. 12, 2007.

"Deltech Corporation, Specialty Applications for Specialty Monomers" obtained from the Internet Archive for Aug. 10, 2002 at: web.archive.org/web/20020810104315/www.deltechcorp.com/deltech02/monomers/monoapps.htm, 1 page printed on Nov. 29, 2004.

"Deltech Corporation, Material Safety Data Sheet" dated May 11, 2005, obtained from the Internet at: www.deltechcorp.com/deltech02/monomers/MSDStbs.htm, pp. 1-6 printed on Mar. 12, 2007.

"Deltech Monomers Intro Sheet", obtained from the Internet Archive for Jun. 10, 2001 at: web.archive.org/web/20010610011526/www.deltechcorp.com/html/monomers/monointro.htm, 1 page printed on Jul. 30, 2004.

NexTerra™ brand name brochure, Valspar Composites, obtained from the Internet Archive for Mar. 11, 2006 at: web. archive.org/web/20060311143804/http://www.valsparcomposites.com/composites/environment/Compliantlines.pdf, 1 page (2006).

South Coast AQMD Agenda No. 31 (available on the Internet at www.aqmd.gov/hb/2005/050731a.html), 10 pages, Jul. 8, 2005.

California South Coast Air Quality Management District (South Coast AQMD) Rule 1162—Polyester Resin Operations, 10 pages, Jul. 8, 2005.

* cited by examiner

*Primary Examiner*—RAndy Gulakowski
*Assistant Examiner*—Alicia M Toscano
(74) *Attorney, Agent, or Firm*—IPLM Group, P.A.

(57) ABSTRACT

A polyester gelcoat composition containing unsaturated polyester resin, a reactive diluent mixture including para-tertiary-butylstyrene, and one or more additives. The gelcoat composition does not include appreciable deleterious amounts of hazardous air pollution solvents. A method of making the gelcoat composition is also disclosed.

20 Claims, No Drawings

LOW-HAP AND ZERO-HAP POLYESTER RESIN SYSTEMS AND ARTICLES PREPARED USING SAME

RELATED APPLICATION

This application is a continuation of application Ser. No. 10/516,238 filed Apr. 29, 2005, which claims the benefit of PCT Application No. PCT/US03/16658 filed May 27, 2003, which in turn claims the benefit of U.S. provisional application Ser. No. 60/384,753 filed May 29, 2002, each of which is entitled Low-HAP and Zero-HAP Polyester Resin Systems and Articles Prepared Using Same, and the disclosures of which are incorporated herein by reference.

BACKGROUND

Polyester resin systems (compositions) have long been used to make a variety of useful products. For example, these systems have been used to manufacture gel coats that find a variety of uses, e.g., in making sinks, countertops, shower stalls/tubs, spas, boat hulls, etc. Typically these compositions comprise an unsaturated polyester resin and a reactive diluent (typically a volatile organic monomer such as styrene). Unfortunately, during curing of the composition some of the volatile organic monomer or Hazardous Air Pollutants (HAPs) is lost into the atmosphere. Due to environmental concerns, legislation was passed which requires reduction in the amount of Hazardous Air Pollutants that may be released into the atmosphere.

One method of reducing such HAPs emission is replacement of the reactive diluent with a less volatile reactive diluent. However, this approach has led to slower curing times and/or incomplete curing at normal ambient temperatures. Another approach is the reduction in the amount of reactive diluent. This approach has led to increases in viscosity beyond useable values. If viscosity increase is compensated by use of a lower molecular weight polyester, then poor final gel coat properties have resulted. Another approach has been the use of a suppressant that reduces the loss of HAPs. Unfortunately, however, none of these approaches has proved fully satisfactory.

From the foregoing, it will be appreciated that what is needed in the art is an environmentally friendly polyester composition. Such systems and methods for preparing the same and using the same are disclosed and claimed herein.

SUMMARY

In one embodiment, this invention relates to novel polyester composition having an unsaturated polyester resin, and a reactive diluent. The polyester composition is preferably substantially HAP-free.

In a presently preferred embodiment, this invention relates to a gelcoat composition comprising a polyester composition having an unsaturated polyester resin, a reactive diluent, and one or more of the following additives: inhibitors, suppressants, surface tension agents, thixotropic agents, fillers, extenders, promoters, copromoters, air release agents, initiators, catalysts, pigments, and the like. The gelcoat composition is preferably substantially HAP-free.

In another embodiment, the present invention relates to the method of making a novel polyester composition that includes providing an unsaturated polyester resin, mixing the unsaturated resin with one or more non-HAP reactive diluent. The resulting polyester composition is preferably substantially HAP-free.

DEFINITIONS

The term "HAP" or "HAPs" refers to those compounds that are classified as Hazardous Air Pollutants by the U.S. Federal Government, Environmental Protection Agency. Section 112 of the Clean Air Act (CAA) lists over 188 pollutants or chemical groups as HAPs. Examples of HAPs include heavy metals like mercury and chromium; organic chemicals like benzene, dioxins and styrene.

The term "substantially HAP-free" means that the compositions of the present invention are contaminated with, or liberate as a result of curing, no more than about 1 percent by weight of a HAP compound. The term "essentially HAP-free" means that the compositions of the present invention are contaminated with, or liberate as a result of curing, no more than about 0.5 percent by weight of a HAP compound. The term "essentially completely HAP-free" means that the compositions of the present invention are contaminated with, or liberate as a result of curing, no more than about 0.25 percent by weight of a HAP compound. The term "completely HAP-free" means that the compositions of the present invention are contaminated with, or liberate as a result of curing, less than 5 parts per million (ppm) of a HAP compound.

The term "polyester composition" refers to the combination of an unsaturated polyester resin and a reactive diluent.

The term "gelcoat" or "gel coat" refers to compositions containing the unsaturated polyester composition and other gelcoat components such as inhibitors, suppressants, surface tension agents, thixotropic agents, fillers, extenders, promoters, copromoters, air release agents, initiators, catalysts, pigments, and the like.

DETAILED DESCRIPTION

The present invention provides polyester compositions that are substantially HAP-free. The compositions are especially useful in a variety of products for the composite FRP (Fiberglass Reinforced Products) industry such as, for example, resins and gel coats.

The polyester compositions preferably comprise one or more polyesters (preferably one or more unsaturated polyester resins) and one or more reactive diluents (preferably a free-radically curable diluent). Suitable polyester resins for use in the present invention typically comprise the condensation product of one or more carboxylic acids (such as mono, di- or poly-functional carboxylic acids) or their derivatives (such as anhydrides, C1-8 alkyl esters, etc.), and one or more alcohols (including mono-functional, di-functional and poly-functional alcohols). Suitable polyester resins for use in the present invention usually encompass between about 30 and 95 percent, preferably between about 50 and 90 percent, more preferably between about 65 and 80 percent by weight of the unsaturated polyester composition.

Typical carboxylic acid components of the present invention may include unsaturated, saturated carboxylic acids, their derivatives, or combinations thereof. Examples of suitable unsaturated carboxylic acids and their derivatives include maleic acid, fumaric acid, chloromaleic acid, itaconic acid, citraconic acid, methyleneglutaric acid, mesaconic acid, acrylic acid, methacrylic acid, and esters or anhydrides thereof.

Examples of suitable saturated dicarboxylic acids and their derivatives include succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, hexahydrophthalic acid or anhydride, tetrachlorophthalic acid, chlorendic acid or anhydride, dodecanedicarboxylic acids, nadic anhydride, cis-5-norbornene-2,3-dicarboxylic acid or anhydride, dimethyl-2,6-naphthenic dicarboxylate, dimethyl-2,6-naphthenic dicarboxylic acid, naphthenic dicarboxylic acid or anhydride and 1,4-cyclohexane dicarboxylic acid. Mono-, di-, tri, or higher carboxylic acids may also be used, for example, ethylhexanoic acid, propionic acid, trimellitic acid, benzoic acid, 1,2,4-benzenetricarboxylic acid, 1,2,4,5-benzenetetracarboxylic acid, and anhydrides thereof may also be used in preparing the polyester resins.

In one embodiment, the carboxylic acids and their derivatives are the combination of a saturated carboxylic acid or derivative, and an unsaturated carboxylic acid or derivative. The saturated carboxylic acids may be aromatic, aliphatic, their derivatives, or a combination thereof. Examples of the various carboxylic acids and their derivatives are disclosed above. Presently preferred aromatic saturated carboxylic acids include o-phthalic acid, isophthalic acid, their derivatives, and the like. Presently preferred aliphatic saturated carboxylic acids include 1,4-cyclohexane dicarboxylic acid, hexahydrophthalic acid, adipic acid, their derivatives, and the like.

Typically, the aromatic carboxylic acid is present in an amount between about 0 and 100 percent, preferably between about 0 and 50 percent, and more preferably between about 0 and 25 percent of the saturated acid portion of the polyester resin. The aliphatic carboxylic acid of the present invention is preferably present in an amount between about 0 and 100 percent, more preferably between about 50 and 100 percent, and most preferably between about 75 and 100 percent of the saturated portion of the polyester resin.

Preferably, the saturated carboxylic acids have between about 8 and 18 carbon atoms, more preferably between about 8 and 15, and most preferably between about 8 and 12 carbon atoms. Preferably, the saturated carboxylic acid is present in an amount between about 10 and 80 percent by mole, more preferably between about 25 and 65 percent by mole, most preferably between about 35 and 50 percent by mole of the acid portion of the polyester resin.

Preferably, the unsaturated carboxylic acids or their derivatives are present in an amount between about 20 and 90 percent by mole, more preferably between about 35 and 75 percent by mole, and most preferably between about 50 and 65 percent by mole of the acid portion of the unsaturated polyester resin. Examples of unsaturated carboxylic acids are disclosed above. Preferably, the unsaturated carboxylic acids have between about 3 and 12, more preferably between about 3 and 8, most preferably between about 4 and 6 carbon atoms. Presently preferred unsaturated carboxylic acids include maleic, fumaric acids, fumaric esters and anhydrides thereof.

Typically, the polyester resins for use in the present invention include alcohols. Suitable alcohols include alkanediols and oxa-alkanediols, for example, ethylene glycol, 1,2-propylene glycol, propane-3-diol, 1,3-butylene glycol, butene-1, 4-diol, hexane-1,6-diol, diethylene glycol, triethylene glycol, polyethylene glycol, cyclohexane-1,2-diol, 2,2-bis-(p-hydroxycyclohexyl)-propane, 5-norbornene-2,2-dimethylol, 2,3-norbornene diol, cyclohexane dimethanol, and the like. Presently preferred are alcohols having a neo-structure.

Suitable alcohols having a neo-structure include 1,2-propanediol, 2-methyl 1,3-propanediol, 2,2-dimethyl heptanediol, 2,2-dimethyl octanediol, 2,2-dimethyl-1,3-propanediol, pentaerythritol, dipentaerythritol, tripentaerythritol, trimethylol propane, di-trimethylol propane, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, and the like. Presently preferred alcohols include 2,2-dimethyl-1,3-propanediol (neopentyl glycol), 2-methyl 1,3-propanediol (MPDiol), and 1,2-propanediol (propylene glycol).

Mono-functional alcohols may also be used in preparing the unsaturated polyester composition. Suitable mono-functional alcohols include benzyl alcohol, cyclohexanol, 2-ethylhexyl alcohol, 2-cyclohexyl ethanol, 2,2-dimethyl-1-propanol, and lauryl alcohol. A presently preferred mono-functional alcohol is 2-ethylhexyl alcohol.

In one embodiment, the polyester resin is prepared from alcohols having a neo structure, wherein the amount of the alcohol having a neo structure present is preferably between about 0 and 70 percent by mole, more preferably between about 45 and 70 percent by mole and most preferably between about 50 and 65 percent by mole of the alcohol in the unsaturated polyester resin.

In another embodiment, the polyester resin is prepared from alcohols having a neo structure, wherein the amount of alcohol having a neo structure present is preferably greater than about 80 percent by mole, more preferably greater than about 90 percent by mole, most preferably about 100 percent by mole of the alcohols in the unsaturated polyester resin.

Where mono-functional alcohol is used, the amount of alcohol present in the polyester resin is preferably between about 0 and 10 percent by mole, more preferably between about 0 and 5 percent by mole of the alcohols in the unsaturated polyester resin.

A catalyst may optionally be included in the preparation of the polyester resin of the present invention. Suitable catalysts may function to enhance an esterification process between a carboxylic acid and an alcohol or transesterification process between an alcohol and an ester. Non-limiting examples of esterification catalysts include stannous-tin or organotin compounds. Presently preferred esterification catalysts include organotin compounds such as FASCAT™ 4100 obtainable from Atofina. The amount of esterification catalyst in the present invention is preferably less than about 0.2 weight percent, more preferably less than about 0.1 weight percent, and most preferably between about 0.01 and 0.05 weight percent of the polyester resin.

Non-limiting examples of transesterification catalysts include metal-containing catalysts (such as antimony glycoxide), alkali metal borohydrides (such as sodium borohydride, potassium borohydride, magnesium borohydride, calcium borohydride, aluminum borohydride, titanium borohydride, and tin borohydride), metal oxides (such as beryllium oxide, magnesium oxide, antimony trioxide, tin(IV) oxide, and dibutyltin oxide), metal hydroxides (such as magnesium hydroxide), metal acetates (such as magnesium acetate, manganese acetate, tin(IV) acetate), metal carbonates (such as lithium carbonate, sodium carbonate, potassium carbonate, magnesium carbonate, tin(IV) carbonate), tetraalkyl metals (such as tetraalkyl titanate, tetraisopropyl titanate, tetra-n-butyl titanate, and tetrakis(2-ethylhexyl)titanate), tetraalkyl zirconate (such tetraisopropyl zirconate, tetra-n-butyl zirconate, tetrakis(2-ethylhexyl)zirconate), and metal nitrates (such as tin(IV) nitrate). Other suitable transesterification catalysts include, for example, Bronsted acids (such as sulfuric acid), and Lewis acids (such as aluminum triisopropoxide). Preferred transesterification catalysts include antimony glycoxide, $(Sb_2(OCH_2CH_2O)_3)$, manganese acetate, and/or combinations thereof. The catalyst may be present in an amount between about 0.05 and 2 percent by weight of the polyester resin.

The polyester resin (preferably unsaturated), may be prepared by usual esterification means known to those skilled in the art. In one embodiment, the polyester resin is prepared by mixing the carboxylic acids or their derivatives with an alcohol, and heating the mixture to between about 90 and 120° C. The mixture heats exothermically by about 40 degrees, for instance to about 150° C. The mixture may then be heated to between about 175 and 215° C. The reaction is preferably continued until the desired acid number is reached and then cooled to about 160° C. At this point the remaining carboxylic acid and alcohol may be added. An esterification catalyst may be added as required. The composition is preferably then heated to between about 190 and 215° C. The reaction may then be continued until the desired acid number and viscosity is attained. The composition is preferably then cooled, and diluted with in the reactive diluent.

Acid number is a reflection of the extent of esterification process and molecular weight of the polyester resin. The esterification process is typically continued until the polyester attains the acid number corresponding to the desired molecular weight. In one embodiment, the final acid number is less than about 30, preferably less than about 20. For applications which require spray application, the inventors have discovered that polyester resins with acid number less than about 30 are preferred and less than about 20 are more preferred. Preferably, the weight average molecular weight of the polyester is between about 1,000 and 4,000, more preferably between about 1,000 and 2,800, most preferably between about 1,200 and 2,000.

The acid number may be reduced by increasing temperature and/or maintaining the reaction temperature until the acid number is reduced to the desired level. In one embodiment, the acid number may be reduced by using an acid neutralizer. The acid neutralizer is added in an amount sufficient to lower the acid number to the desired level. Examples of acid neutralizers include ethylene carbonate, glycidyl neodecanate (CARDURA™ E-10, available from Resolution Performance Products), carbodiimides, glycidyl methacrylate, fatty primary alcohols, fatty epoxides, and mixtures thereof.

The polyester compositions (e.g., bases and gel coats) of the present invention are preferably HAP-free or substantially HAP-free. Consequently, when incorporating reactive diluents into the compositions of the present invention it is preferable that a majority of the reactive diluent used comprises non-HAPs compounds. This is in stark contrast to the commercially available systems that utilize large amounts of HAPs diluents such as vinylbenzene (styrene monomer) or methyl methacrylate (MMA).

The reactive diluent preferably comprises between about 5 and 50 weight percent, more preferably between about 10 and 45 weight percent, and most preferably between about 20 and 35 weight percent of the unsaturated polyester composition.

Preferred reactive diluents include non-HAPs ethylenically unsaturated, oligomeric or monomeric compounds. Mixtures and combinations of such compounds may be used, however, the combination preferably does not include appreciable deleterious amounts of HAPs-type compounds.

Examples of suitable non-HAPs reactive diluents include: substituted styrenes (e.g., para-tertiary-butylstyrene, divinylbenzene, vinyltoluene, para-methylstyrene); mono-, di-, and poly-functional esters of unsaturated monofunctional acids (such as acrylic acid and methacrylic acid) with alcohols or polyols (such as those described herein), each having from 1 to 18 carbon atoms; mono-, di-, and poly-functional esters of unsaturated monofunctional alcohols with carboxylic acids or their derivatives, each having from 1 to 18 carbon atoms. Other suitable reactive diluents include, for example, butanediol dimethacrylate, trimethylolpropane trimethacrylate, ethylene dimethacrylate (EGDMA), polyethylene glycol dimethacrylate (PEGDMA), polypropylene glycol dimethacrylate (PPGDMA), trimethylol propane trimethacrylate (TMPTMA), tetramethylol propane trimethacrylate, dipropylene glycol dimethacrylate, isodecyl methacrylate, 1,3-butylene glycol dimethacrylate, 2-hydroxy ethyl methacrylate (2-HEMA), 1,6 hexane diol dimethacrylate (HDODMA), trieththylene glycol dimethacrylate (TEGDMA), acetoacetoxyethyl methacrylate (AAEM), and the acrylate versions of these methacrylates; diallyl phthalate; triallylcyanurate; vinyl ethers; and the like. Mixtures of these compounds may be used. Preferred components are para-tertiary butyl styrene, EGDMA, 2-HEMA, and modifying mono-, di-, poly-(meth)acrylate oligomers, and combinations thereof.

The above unsaturated polyester resin may be used in a variety of applications including gelcoating, resin lamination, resin transfer molding (RTM), infusion, filament winding, pultrusion, sheet molding compounding, bulk molding compounding, etc. The coating and articles of manufacture include sinks, countertops, shower stalls/tubs, spas, boat hulls and decks, truck cabs, patio brick coatings, etc.

The unsaturated polyester composition may be used together with other additives (as described herein) to form gelcoats and polyester articles. The applications may include the spray up manufacture of coating and articles. In this method, one or more of the above unsaturated polyester compositions are fed into a spray gun along with optional extenders or fillers, such as chopped fiberglass, mica and/or thixotropic agents, such as fumed silica or precipitated silica. The unsaturated polyester composition may be mixed with the fibers internal or external to the spray gun. Another method of using unsaturated polyester compositions is the hand lay up method of fabrication. In this method the fiberglass, as roving or chopped fibers are added to an open mold and the unsaturated polyester composition is wetted out on the fiberglass by hand rollers, brushes and squeegees. Pultrusion involves pulling roving fiberglass strands through an unsaturated polyester composition bath and through a heated die.

Gelcoats are curable compositions that contain one or more of the above unsaturated polyester compositions along with other additives. These other additives include inhibitors, suppressants, surface tension agents, thixotropic agents, fillers, extenders, promoters, copromoters, air release agents, initiators, catalysts, and optionally pigments.

The gelcoat composition may further comprise inhibitors to help, for example, maintain an acceptable shelf life for the composition. Preferred inhibitors include free-radical inhibitors/scavengers. Examples of suitable inhibitors include quinones (such as, for example, hydroquinone (HQ), toluhydroquinone (THQ), mono-tertiary-butyl hydroquinone (MT-BHQ), di tertiary-butyl hydroquinone (DTBHQ), napthaquinone (NQ), and monomethyl ether hydroquinone (MEHQ)), butylated hydroxy toluene (BHT), tertiary butyl catechol (TBC), and the like.

Preferably, the amount of inhibitors in the gelcoat composition is less than about 0.5 weight percent, more preferably less than about 0.3 weight percent, and most preferably less than about 0.1 weight percent of the gelcoat composition.

Suitable gelcoat compositions of the present invention may optionally include a suppressant such as those described in U.S. Pat. No. 5,874,503, which is hereby incorporated by reference. The suppressant acts to reduce volatile organic emissions. Preferred suppressants include paraffin wax, STY-RID™, and the like. Commercially available suppressants include BYK-S 740 and BYK-S 750, obtainable from BYK-Chemie.

Preferably, the amount of the optional suppressant is between about 0 and 2 weight percent, more preferably between about 0 and 1.5 weight percent, and most preferably between about 0.1 and 1 weight percent of the gelcoat composition.

The gelcoat composition of the present invention may also optionally contain a surface tension agent. The surface tension agent, if used, is preferably present in an amount between about 0 and 1 weight percent, and more preferably between about 0.01 and 0.5 weight percent of the gelcoat composition. The agent preferably acts to reduce the polar surface tension to a value below the dispersive surface tension. The surface tension agent lowers the surface tension at the surface of the cured gelcoat. Examples of surface tension agents include silicone and fluorocarbon surfactants.

Examples of silicone surfactants include dimethyl silicones, liquid condensation products of dimethylsilane diol, methyl hydrogen polysiloxanes, liquid condensation products of methyl hydrogen silane diols, dimethylsilicones, aminopropyltriethoxysilane, and methyl hydrogen polysiloxanes. In one embodiment, the silicone surfactant is a polysiloxane, preferably a polydimethylsiloxane block polyether, such as BYK-306 available from BYK Chemie. Other suitable surfactants include those commercially available, such as DC100 and DC200 from Dow Corning; the MODA-FLOW™ series from Solutia; and SF-69 and SF-99 from GE Silicones Company.

Fluorocarbon surfactants, such as fluorinated potassium alkyl carboxylates, fluorinated alkyl quaternary ammonium iodides, ammonium perfluoroalkyl carboxylates, fluorinated alkyl polyoxyethylene ethanols, fluorinated alkyl alkoxylates, fluorinated alkyl esters, and ammonium perfluoroalkyl sulfonate sold under the FLUORAD trademark of 3M Company may also be used, if desired.

The gelcoat composition of the present invention may optionally include a thixotropic agent. Typical thixotropic agents include silica compounds (including hydrophilic or phobic fumed silica and precipitated silica), and inorganic clays (including bentonite, garamite, and hectorite clay). The thixotropic agents are preferably present in an amount between about 0.5 and 5 weight percent, more preferably between about 0.5 and 2.5 weight percent of neat polyester resin.

The gelcoat composition may optionally contain fillers or extenders. Fillers or extenders when used, help provide better flow properties, improved physical properties, abrasion resistance, etc. Typical fillers or extenders include chopped or milled fiberglass, talc, silicone dioxide, titanium dioxide, wollastonite, mica, alumina trihydrate, clay, calcium carbonate, magnesium carbonate, barium carbonate, calcium sulfate, magnesium sulfate, barium sulfate, and the like. The amount of optional fillers or extenders present in the gelcoat composition is preferably between about 0 and 45, more preferably between about 10 and 35 parts per 100 parts of neat polyester resin.

The gelcoat composition may optionally include a promoter and/or copromoter. A promoter is any electron donating species that helps in the decomposition of an initiator. A promoter may also facilitate the decomposition of a catalyst, if needed. Suitably, a promoter is added to an unsaturated polyester composition to accelerate the decomposition of a peroxide initiator to free radicals and thereby initiate or speed the curing of the composition at relatively low temperatures, for example, at temperatures in the range of 0 to 30° C. Promoters are typically used in an amount less than about 1 weight percent, more preferably less than about 0.5 weight percent, most preferably between about 0.06 and 0.5 weight percent of the neat polyester resin.

Among the materials that have been reported as being effective promoters are metal compounds (such as cobalt, manganese, potassium, iron, vanadium, copper, and aluminum salts of organic acids); amines (such as dimethylaniline, diethylaniline, phenyl diethanolamine, dimethyl paratoluidine, and 2-aminopyridine); Lewis acids (such as boron fluoride dihydrate and ferric chloride); bases (such as tetramethyl ammonium hydroxide); quaternary ammonium salts (such as trimethyl benzyl ammonium chloride and tetrakismethylol phosphonium chloride); and sulfur compounds (such as dodecyl mercaptan and 2-mercaptoethanol); dimethyl acetoacetamide; ethyl acetoacetate, and methyl acetoacetate. Typical promoters include cobalt salts of organic acids for the low temperature decomposition of peroxide catalysts and the curing of unsaturated gelcoat compositions. Preferably, the cobalt and potassium salts of aliphatic monocarboxylic acids have between about 5 and 20 carbon atoms, more preferably between about 8 and 12 carbon atoms. Other preferred promoters include alicyclic acids having between about 5 and 7 carbon atoms. Most preferred promoters include cobalt octanoate, potassium octanoate, dimethyl acetoacetamide, ethyl acetoacetate, and methyl acetoacetate.

If desired, the gelcoat compositions of the present invention may also comprise a suitable "defoamer" or air release agent. Air release agents enhance the ability of the polyester composition to be free of trapped air (porosity). Typical air release agents may be silicone and non-silicone based. Non-limiting examples of air release agents include acrylic polymers, hydrophobic solids, and mineral oil based paraffin waxes. Commercially available air release agents or defoamers, such as those sold under the designation BYK-066, BYK-077, BYK-500, BYK-501, BYK-515, and BYK-555 from BYK-Chemie may be used.

Preferably, the amount of optional defoamers present in the gelcoat composition is less than about 1.5 weight percent, more preferably less than about 1 weight percent, and most preferably between about 0 and 0.5 weight percent of the polyester resin.

A catalyst may be added to the gelcoat composition at the time of application to the intended substrate. Suitable catalysts include free-radical catalysts such as are commonly used in the art. Peroxide catalysts are preferred (e.g., benzoyl peroxide, methyl ethyl ketone peroxide, cumene hydroperoxide, etc.). Alternatively, azoalkane-type catalysts may be employed. Commercially available catalysts include DDM9 and DHD9 obtainable from Atofina, HIGH POINT™ 90 obtainable from Witco, CADOX™ 50 from Norac, similar catalysts from Akzo Nobel, and the like.

Alternatively, the gelcoat composition may optionally include a catalyst. Suitable catalysts that may be included in the gelcoat composition are those that are inert in storage and are activated during the application process. Radiation-activated initiators (e.g., U.V., visible or other forms) may be utilized in appropriate circumstances (e.g., when radiation is conveniently able to be exposed to the composition at the time curing is desired). Other such catalysts include heat activated catalysts that may be similarly activated during the application and curing process by sufficiently raising the temperature of the gelcoat composition. Typical radiation activated catalysts and heat activated catalysts (such as, cumene hydroperoxide), and/or UV activated catalysts (such as, IRGA-CURE™ 819 obtainable from Ciba Specialty Chemicals) may be used.

Preferably, the amount of catalyst present in the polyester resin of the present invention is between about 0.5 and 3 weight percent, more preferably between about 1 and 2.5 weight percent, and most preferably between about 1.2 and 2 weight percent of the polyester resin.

Typically, the gelcoat composition is prepared by blending a polyester resin with other gelcoat components as is known to those in the art. After blending, additives are added as required, and the gelcoat composition is diluted with additional reactive diluent of the present invention to a Brookfield viscosity of between about 2,000 and 10,000 centipoise, more preferably between about 3,000 and 8,000 centipoise, most preferably between about 3,500 and 5,000 centipoise at 25° C. (77° F.), using spindle #4. The gel and cure time of a small portion of the gelcoat is determined. If the gel and cure time is too short, inhibitors, such as phenols like hydroquinone and tertiary butyl catechol may be added to increase the gel time. If the gel and cure time is too long, then one or more of the above promoters is added to decrease the gel time.

Typically, the amount of unsaturated polyester composition present in the gelcoat composition is between about 35 and 85 weight percent, more preferably between about 40 and 65 weight percent, and most preferably between about 45 and 55 weight percent of the gelcoat composition.

In one embodiment, the gelcoat composition prepared as described above may be diluted with a reactive diluent comprising para-tertiary butyl styrene (PTBS) and ethylene glycol dimethacrylate (EGDMA). Additives such as pigments, may also be included to prepare a substantially HAP-free exterior gelcoat composition. The absence of HAP in the gelcoat composition is determined by Method 18 at the CARL Laboratory at Purdue University using a carbon absorption column and determining type and quantity of emissions in compliance with applicable EPA requirements.

In another embodiment of the present invention, the gelcoat composition prepared as described above may be diluted with a reactive diluent comprising para-tertiary butyl styrene and 2-hydroxyethyl methacrylate (2-HEMA). Additives such as pigments may also be included to prepare a primer gelcoat composition that is substantially HAP-free.

Preferably, the amount of reactive diluent present in the gelcoat composition is between about 15 and 50 weight percent, more preferably between about 20 and 45 weight percent, and most preferably between about 25 and 40 weight percent of the gelcoat composition.

The following examples are offered to aid in understanding of the present invention and are not to be construed as limiting the scope thereof. Unless otherwise indicated, all parts and percentages are by weight. The constructions cited were evaluated by tests as follows:

Total VOC emissions are determined by a total carbon analyzer.

Total HAP emissions are determined by a carbon absorption column in conjunction with a mass spectrophotometer to determine type and quantity of HAP emission.

EXAMPLES

Example 1

Run 1—Preparation of Polyester Resin

TABLE 1a

| Material | Parts by Weight |
| --- | --- |
| 2-Ethylhexyl Alcohol | 6.0 |
| Neopentyl Glycol | 11.7 |
| Propylene Glycol | 2.4 |
| Methylpropanediol | 13.8 |
| Isophthalic Acid | 16.5 |
| Maleic Anhydride | 19.6 |
| 2-Hydroxyethyl Methacrylate | 30.0 |

In a suitable reaction vessel, equipped with a thermometer, nitrogen blanket, reflux column, water trap and stirrer, neopentyl glycol (obtainable from Eastman Chemical), methylpropanediol (obtainable from Lyondell), propylene glycol (obtainable from Dow Chemical), catalyst FASCAT™ 4100 (obtainable from Atofina) and isophthalic acid (obtainable from Eastman Chemical) were charged and heated to a temperature of 100° C. The mixture was allowed to heat exothermically to 150° C., and heating was continued until the temperature reached 190° C. After the desired acid number of less than 20 was obtained, the mixture was cooled to 160° C. Maleic anhydride (obtainable from Ashland Chemical) and 2-ethylhexyl alcohol (obtainable from Eastman Chemical) were then added. The mixture was then heated to 190° C., and maintained for one hour, at which time more heat was added to raise the temperature of the mixture to 215° C. and maintained until an acid number of less than 15 was obtained. The mixture was then cooled to 60° C. and diluted with 2-hydroxyethyl methacrylate (obtainable from Rohm and Haas).

Run 2—Preparation of Polyester Resin

TABLE 1b

| Material | Parts by Weight |
| --- | --- |
| 2-Ethylhexyl Alcohol | 6.0 |
| Neopentyl Glycol | 11.7 |
| Propylene Glycol | 2.4 |
| Methylpropanediol | 13.8 |
| Isophthalic Acid | 16.5 |
| Maleic Anhydride | 19.6 |
| Para-Tertiary-Butylstyrene | 30.0 |

In a suitable reaction vessel, equipped with a thermometer, nitrogen blanket, reflux column, water trap and stirrer, Neopentyl Glycol (obtainable from Eastman Chemical), methylpropanediol (obtainable from Lyondell), propylene glycol (obtainable from Dow Chemical), catalyst FASCAT™ 4100 (obtainable from Atofina) and isophthalic acid (obtainable from Eastman Chemical) were charged and heated to a temperature of 100° C. The mixture was allowed to heat exothermically to 150° C., and heating was continued until the temperature reached 190° C. After the desired acid number of less than 20 was obtained, the mixture was cooled to 160° C. Maleic anhydride (obtainable from Ashland Chemical) and 2-ethylhexyl alcohol (obtainable from Eastman Chemical) were then added. The mixture was then heated to 190° C., and maintained for one hour, at which time more heat was added to raise the temperature of the mixture to 215° C. and maintained until the acid number of less than 15 was obtained. The mixture was then cooled to 60° C. and diluted with para-tertiary-butylstyrene (obtainable from Deltech).

Example 2

Run 1—Preparation of Primer Gelcoat Composition

TABLE 2a

| Material | Parts by Weight |
| --- | --- |
| Polyester Resin from Ex. 1, Run 1 | 52.0 |
| Para-Tertiary-Butylstyrene | 4.0 |
| BYK-A 555 | 0.4 |
| TI-PURE R-706 | 5.0 |
| PORTARYTE B-10 | 5.0 |
| SPACERITE S-11 | 5.0 |
| AEROSIL 200 | 1.0 |
| 2-Hydroxyethyl Methacrylate | 12.0 |
| EGDMA | 10.0 |
| Additives | 5.6 |

In a suitable mixing tank equipped with a high-speed mixer the polyester resin from Example 1, Run 1, diluted with para-tertiary butyl styrene (obtainable from Deltech), and BYK-A 555 (obtainable from Byk Chemie). TI-PURE R-706 (obtainable from DuPont), PORTARYTE B-10 (obtainable from Ankerpoort, Nev.), SPACERITE 5-11 (obtainable from Alcoa) and AEROSIL 200 (obtainable from Degussa) were slowly added and mixed at high speed until a Hegman Grind of 6 was achieved. The composition was further diluted with 2-hydroxyethyl methacrylate (obtainable from Rohm and Haas) and ethylene glycol dimethacrylate (SR 206 obtainable from Sartomer). The remaining additives were then added. The gelcoat composition was then thoroughly mixed for about twenty to forty minutes.

Run 2—Preparation of Exterior Gelcoat Composition

TABLE 2b

| Material | Parts by Weight |
| --- | --- |
| Polyester Resin from Ex. 1, Run 2 | 46.4 |
| Para-Tertiary-Butylstyrene | 3.6 |
| BYK-A 555 | 0.4 |
| TI-PURE R-706 | 18.0 |
| PORTARYTE B-10 | 4.0 |
| SPACERITE S-11 | 7.0 |
| AEROSIL 200 | 1.0 |
| EGDMA | 16.2 |
| Additives | 3.4 |

In a suitable mixing tank equipped with a high-speed mixer the polyester resin from Example 1, Run 2, diluted with para-tertiary butyl styrene (obtainable from Deltech), and BYK-A 555 (obtainable from Byk Chemie). TI-PURE R-706 (obtainable from DuPont), PORTARYTE B-10 (obtainable from Ankerpoort, Nev.), SPACERITE 5-11 (obtainable from Alcoa) and AEROSIL 200 (obtainable from Degussa) were slowly added and mixed at high speed until a Hegman Grind of 6 was achieved. The composition was further diluted with 2-hydroxyethyl methacrylate (obtainable from Rohm and Haas) and ethylene glycol dimethacrylate (SR 206 obtainable from Sartomer). The remaining additives were then added. The gelcoat composition was then thoroughly mixed for about twenty to forty minutes.

Having thus described the preferred embodiments of the present invention, those of skill in the art will readily appreciate that the teachings found herein may be applied to yet other embodiments within the scope of the claims hereto attached. The complete disclosures of all patents, patent documents, and publications are incorporated herein by reference as if individually incorporated.

What is claimed is:

1. A polyester gelcoat composition, comprising:
   an unsaturated polyester resin;
   a reactive diluent mixture the majority by weight of which is para-tertiary-butylstyrene;
   one or more additives comprising an inhibitor, suppressant, surface tension agent, thixotropic agent, filler, extender, promoter, copromoter, air release agent, initiator, catalyst or pigment,
   wherein the gelcoat composition is suitable for the spray up manufacture of gelcoat coatings and gelcoat articles, and is curable at a temperature of 0 to 30° C.

2. The gelcoat composition of claim 1, wherein the unsaturated polyester resin comprises the condensation product of one or more carboxylic acids or their derivatives, and one or more alcohols.

3. The gelcoat composition of claim 2, wherein the carboxylic acids or their derivatives comprise maleic acid, fumaric acid, chloromaleic acid, itaconic acid, citraconic acid, methyleneglutaric acid, mesaconic acid, succinic acid, glutaric acid, d-methylglutaric acid, adipic acid, sebacic acid, pimelic acid, o-phthalic acid, isophthalic acid, terephthalic acid, dihydrophthalic acid, tetrahydrophthalic acid, tetrachlorophthalic acid, hexahydrophthalic acid, dodecane dicarboxylic acid, nadic acid, cis-5-norbornene-2,3-dicarboxylic acid, dimethyl-2,6-naphthenic dicarboxylate, dimethyl-2,6-naphthenic dicarboxylic acid, naphthenic dicarboxylic acid, 1,4-cyclohexane dicarboxylic acid, ethylhexanoic acid, methacrylic acid, trimellitic acid, acrylic acid, propionic acid, benzoic acid, 1,2,4-benzenetricarboxylic acid, 1,2,4,5-benzenetetracarboxylic acid, anhydrides thereof, or combination thereof.

4. The gelcoat composition of claim 2, wherein the carboxylic acids or their derivatives comprise isophthalic acid, maleic acid, anhydrides thereof, or combination thereof.

5. The gelcoat composition of claim 2, wherein the alcohols comprise 2,2-dimethyl-1,3-propanediol, 2-methyl 1,3-propanediol, 1,2-propanediol, or 2-ethylhexyl alcohol.

6. The gelcoat composition of claim 1, wherein the unsaturated polyester resin further comprises an esterification catalyst comprising an organotin compound, antimony glycoxide, manganese acetate, or mixture thereof.

7. The gelcoat composition of claim 1, wherein the unsaturated polyester resin is between about 30 and 95 percent by weight of the composition.

8. The gelcoat composition of claim 1, wherein the reactive diluent mixture also comprises butanediol dimethacrylate, trimethylolpropane trimethacrylate, ethylene glycol dimethacrylate, polyethylene glycol dimethacrylate, polypropylene glycol dimethacrylate, tetramethylol propane trimethacrylate, dipropylene glycol dimethacrylate, isodecyl methacrylate, 1,3-butylene glycol dimethacrylate, 2-hydroxy ethyl methacrylate, 1,6 hexane diol dimethacrylate, triethylene glycol dimethacrylate, acetoacetoxyethyl methacrylate, their acrylates, divinylbenzene, vinyltoluene, para-methylstyrene, diallyl phthalate, triallylcyanurate, vinyl ethers, or mixture thereof.

9. The gelcoat composition of claim 1, wherein the reactive diluent mixture also comprises 2-hydroxyethylmethacrylate, ethylene glycol dimethacrylate or mixture thereof.

10. The gelcoat composition of claim 1, wherein the reactive diluent mixture comprises para-tertiary-butylstyrene, 2-hydroxyethylmethacrylate, ethylene glycol dimethacrylate and styrene.

11. The gelcoat composition of claim 1, wherein the reactive diluent mixture also comprises an ethylenically unsaturated, monomeric or oligomeric compound.

12. The gelcoat composition of claim 1, wherein the reactive diluent mixture is between about 5 and 50 percent by weight of the composition.

13. The gelcoat composition of claim 1, wherein the reactive diluent mixture does not include appreciable deleterious amounts of hazardous air pollution solvents.

14. The gelcoat composition of claim 13, wherein the composition is contaminated with, or liberates as a result of curing, no more than about 1 percent by weight of a hazardous air pollutant compound.

15. The gelcoat composition of claim 13, wherein the composition is contaminated with, or liberates as a result of curing, less than 5 parts per million of a hazardous air pollutant compound.

16. The gelcoat composition of claim 13, wherein the reactive diluent mixture comprises para-tertiary-butylstyrene, 2-hydroxyethylmethacrylate and ethylene glycol dimethacrylate.

17. The gelcoat composition of claim 13, wherein the unsaturated polyester resin is between about 35 and 85 percent by weight of the gelcoat composition.

18. The gelcoat composition of claim 13, wherein the reactive diluent mixture is between about 15 and 50 percent by weight of the gelcoat composition.

19. A method of making a polyester gelcoat coating or gelcoat article, comprising the steps of:
   providing an unsaturated polyester resin; and
   mixing the unsaturated polyester resin with:
   i) a reactive diluent mixture the majority by weight of which is para-tertiary-butylstyrene, and with
   ii) one or more additives comprising an inhibitor, suppressant, surface tension agent, thixotropic agent, filler, extender, promoter, copromoter, air release agent, initiator, catalyst or pigment to form a gelcoat composition, and
   spraying the composition on to a substrate to form the gelcoat coating or gelcoat article.

20. A method according to claim 19, further comprising curing the gelcoat coating or gelcoat article at a temperature of 0 to 30° C.

* * * * *